United States Patent [19]

Clark et al.

[11] 4,393,736

[45] Jul. 19, 1983

[54] CUTTER FOR A MOVING STRAND

[75] Inventors: Thomas R. Clark, Wilmington, Del.; Alvin E. Lillmars, Newtown Square, Pa.; Elwood A. Roth, Seaford; Alvin L. Schmick, Frederica, both of Del.; Maurice C. Todd, Chadds Ford, Pa.

[73] Assignee: E. I. Du Pont de Nemours and Company, Wilmington, Del.

[21] Appl. No.: 252,720

[22] Filed: Apr. 10, 1981

[51] Int. Cl.³ ............................................. B65H 35/00
[52] U.S. Cl. ....................................... 83/100; 83/554; 83/566
[58] Field of Search ................. 83/100, 554, 566, 630, 83/616, 160; 57/86, 87

[56] References Cited

U.S. PATENT DOCUMENTS

| 3,090,268 | 5/1963 | Edwards . | |
|---|---|---|---|
| 3,175,290 | 3/1965 | Bunting et al. . | |
| 3,241,234 | 3/1966 | Kiefer et al. | 83/100 X |
| 3,564,958 | 2/1971 | Richter | 83/100 |
| 3,807,270 | 4/1974 | Wirz . | |
| 3,864,999 | 2/1975 | Charles et al. . | |
| 3,960,305 | 6/1976 | Boyle et al. . | |
| 4,214,357 | 7/1980 | Delves | 83/554 X |

Primary Examiner—Robert E. Garrett
Assistant Examiner—L. Meier

[57] ABSTRACT

A cutting device used in conjunction with an apparatus for processing a continuously advancing strand material is actuated by an air cylinder that is preloaded to full pressure before moving the blade to cut the strand. An air activated linkage releases the cutting blade to begin its travel under full operating pressure.

2 Claims, 5 Drawing Figures

CUTTER FOR A MOVING STRAND

BACKGROUND

This invention relates to the processing of strands and, more particularly, to the processing of a plurality of strands advancing away from a continuously operating source.

The term strand as used herein is intended to include either a single filament, a gathered plurality, or warp of such filaments as well as yarns, webs, and the like produced from the filaments.

It is well known in the textile industry that a spinning process, wherein filament-forming material is extruded from a spinneret, is normally not stopped when a defective condition arises during the processing steps which follow extrusion. Such defects are usually encountered in the form of roll wraps, breaks, or similar defects which appear in the downstream processing of the strands. Rather than interrupt the spinning process, one practice has been to employ sensing devices which function to detect the various defects and to actuate cut down equipment thereby interrupting the downstream delivery from a given source. One such apparatus is shown by Edwards in U.S. Pat. No. 3,090,268 wherein running strands are swept to a cutter, then cut and introduced to an aspirator through which the cut strands are withdrawn.

The cutter is a vital component of the system and while the cutting devices of the prior art have proven satisfactory for cutting a few strands at one time, improvement is needed to reliably handle large warps of up to 40 ends.

SUMMARY OF THE INVENTION

With the above in mind, the apparatus of this invention is located in a machine for processing at least one continuously advancing strand and comprises a support situated adjacent the path of travel of the strand, a bed knife attached to said support and located below the path of the strand, and an arm normally positioned above the path of the strand for movement across the strand path to engagement with said bed knife. A linkage mechanism having a knee is pivotally connected at one end to the support while the other end of the linkage mounts said arm for said movement. A first motive means is coupled to said linkage for imparting said movement. A second motive means is engageable with the knee of said linkage to hold the knee in an over-the-center position and limit movement of said arm to a location slightly above the strand. When energized the second motive means moves the knee over center and allows the arm to complete its movement to engagement with said bed knife.

The apparatus includes a waste jet or the like for removing the advancing strand after it has been severed. Included, also, is a strand isolation bar mounted for transverse movement across the strand path and above the waste jet.

DETAILED DESCRIPTION OF THE ILLUSTRATED EMBODIMENT

Figure 1:
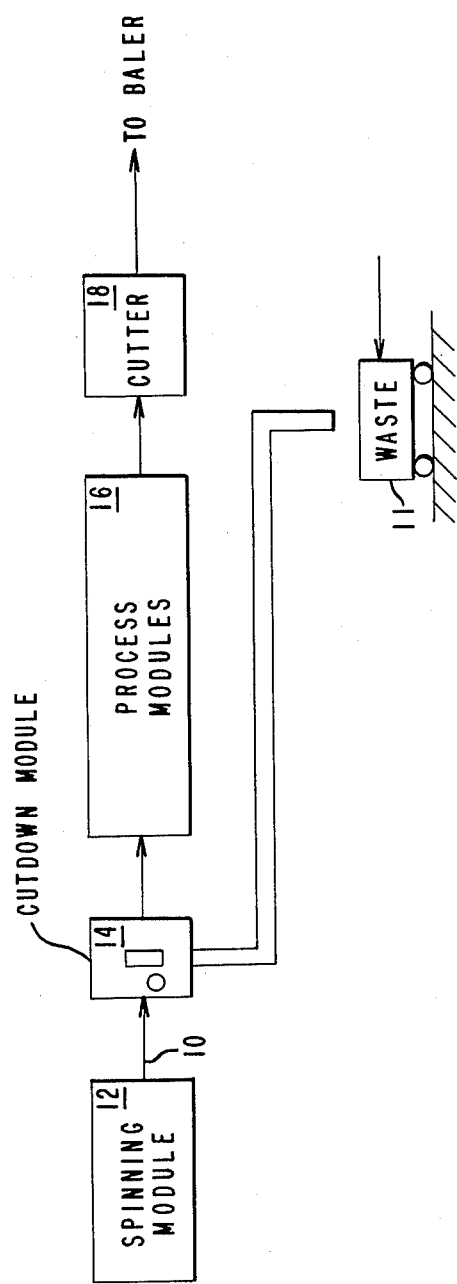
FIG. 1 is a block diagram of the process to which this invention applies.

The process chosen for illustration of the apparatus of this invention is a continuous process for manufacturing staple yarns from a continuously running warp 10 and includes, as shown in FIG. 1, a spinning module 12 where filament forming material is extruded from spinnerets, a cutdown module 14, a process module 16 wherein various steps such as drawing and annealing are performed, and cutter 18 which cuts the warp into staple lengths and feeds cut staple yarn to a baler (not shown). The function of the cutdown module 14 is to sever the warp 10 and divert it to the waste hamper 11 when a defective condition arises during the processing steps which follow extrusion.

Figure 2:
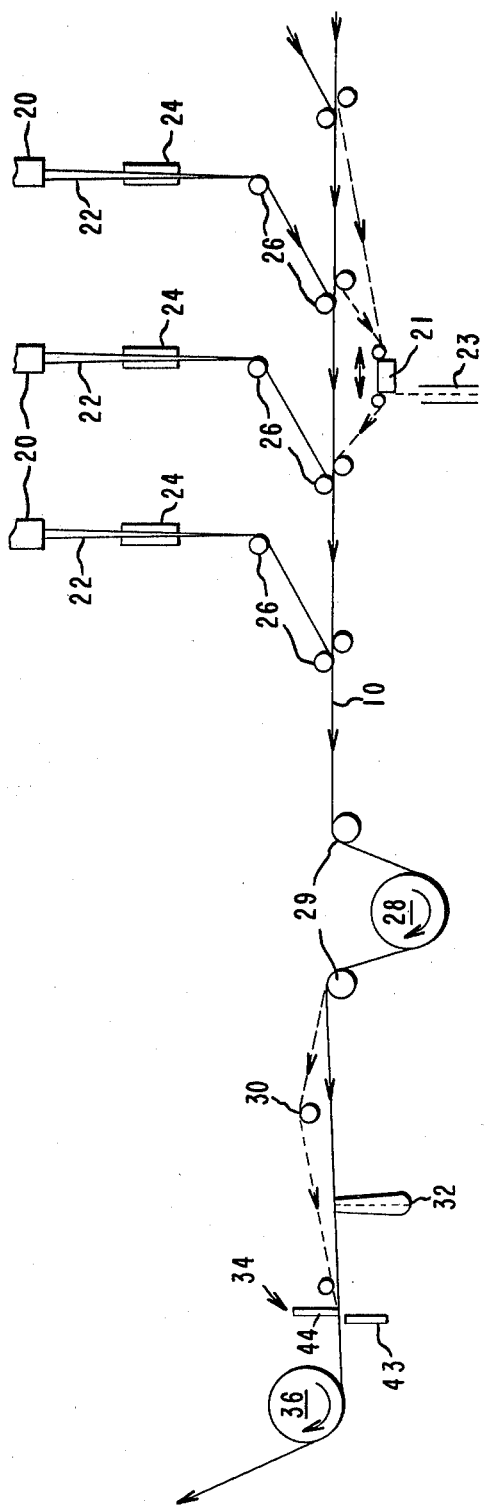
FIG. 2 is a schematic diagram of FIG. 1 showing a restringing operation after a cutdown.

Referring now to FIG. 2, a portion of the process for manufacturing that is the spinning module and the cutter module is shown schematically to include spinnerets 20 extruding threadlines 22 over finish rolls 24 around guides 26 into warp sheet 10. The warp sheet passes around a polished chrome driven roll 28 and its associated idler rolls 29 past and underneath an isolation bar 30 which is extendable and retractable across the path of the warp 10 then over waste jet 32 and through cutter unit 34 to a second driven roll 36. An interlacing jet 21 is located below warp 10 and is moveable from one position to another in the spinning module. A sucker gun 23 is used in association with the interlace jet during restringing after the warp has been cut and all ends are running into waste jet 32. To accomplish restringing the isolation bar 30 is extended across the warp path above the waste jet 32 to isolate ends being restrung from the ends running to the waste jet. Initially, one end at one spinning position is cut from the waste jet 32 and directed over the top of the isolation bar, through the cutter, and on to the process module. Ends are then progressively cut out of the waste jet 32 at the spinning position and tied into the ends running over the isolation bar 30 using interlace jet 21 and sucker gun 23. The isolation bar positions the ends outside the aspirating zone of the waste jet 32. When all the ends have been restrung, the jet 32 is turned off and the isolation bar 30 is retracted to reposition the warp in its normal path directly over the waste jet 32.

Figure 3:
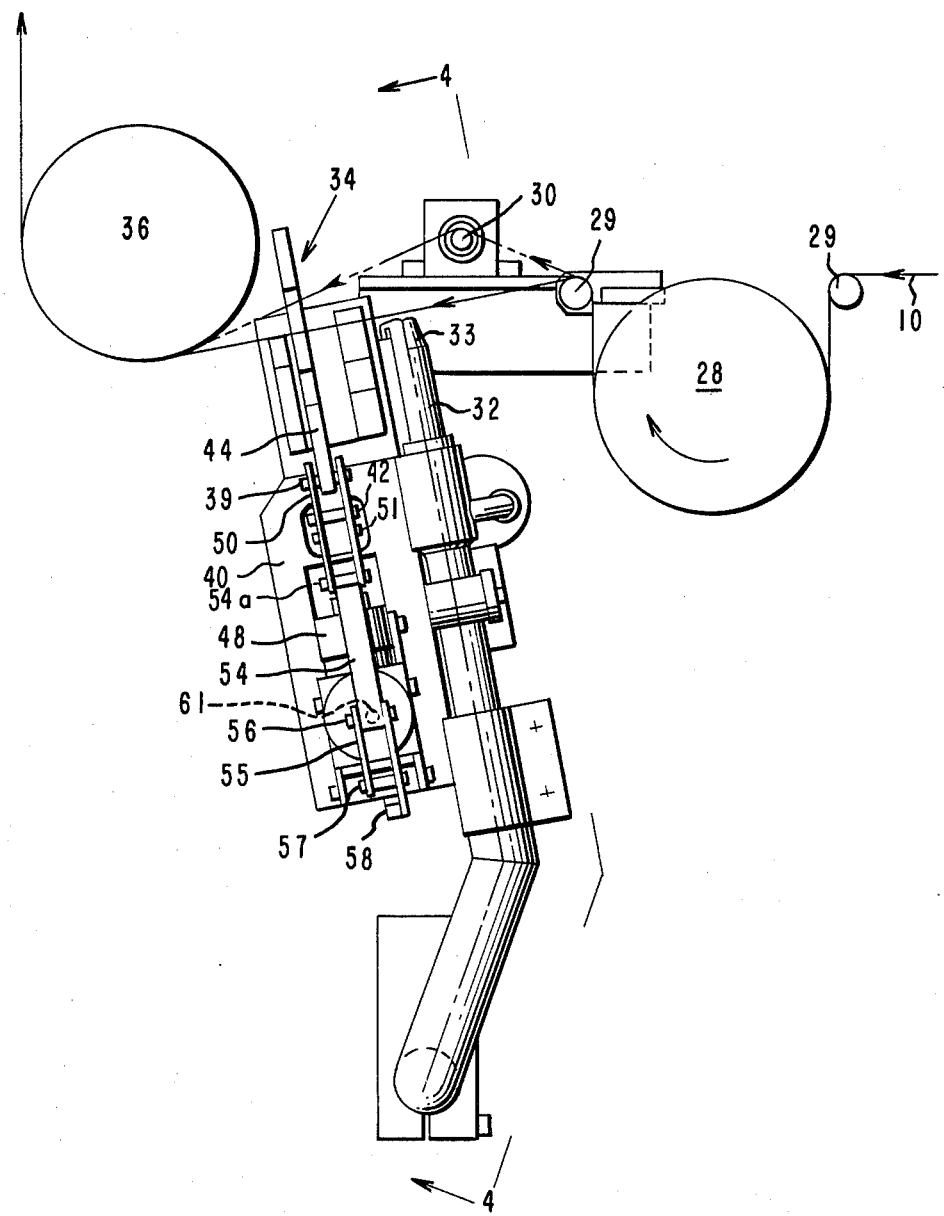
FIG. 3 is an elevation view of the apparatus of this invention including the isolation bar and the waste jet.
Figure 4:
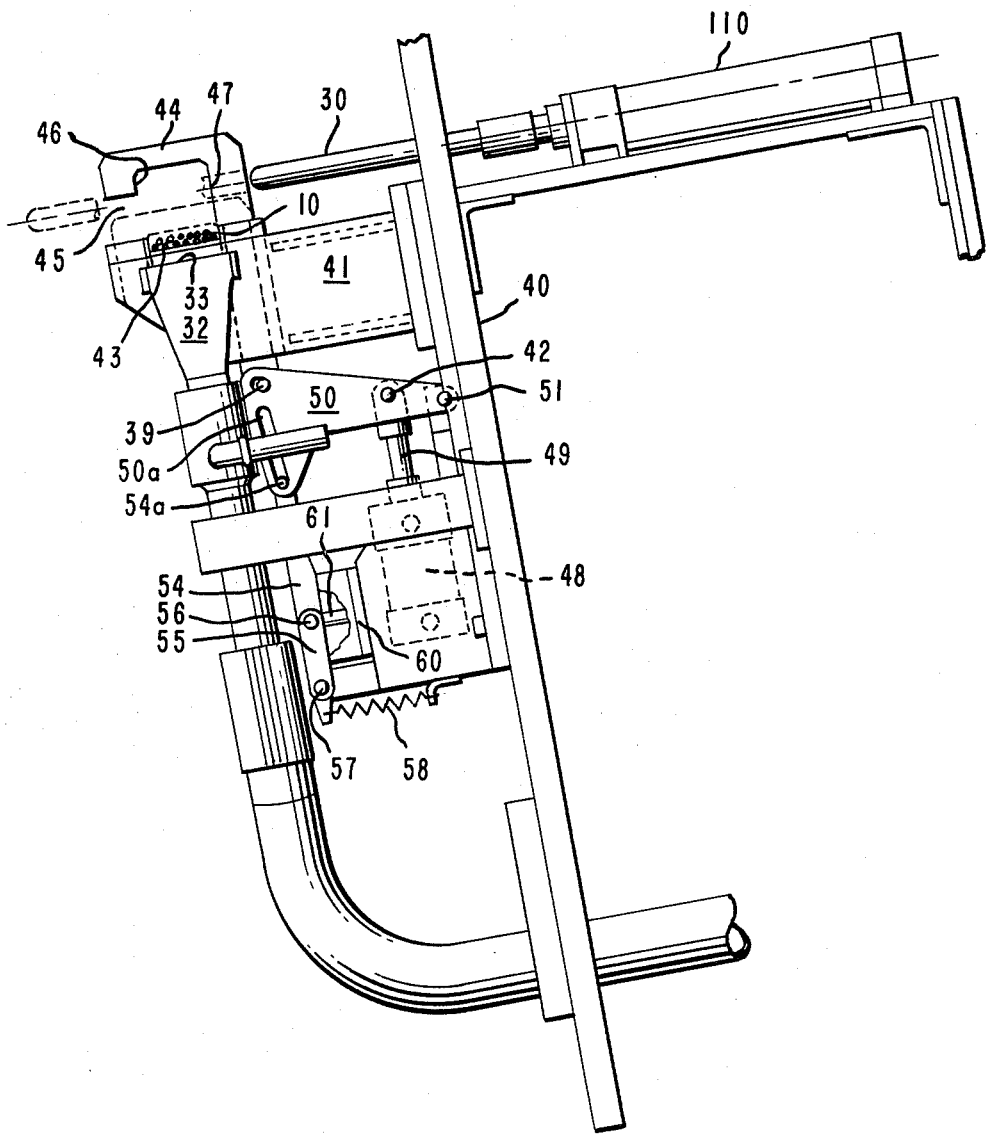
FIG. 4 is a view of FIG. 3 taken along line 4—4.

As illustrated in FIGS. 3 and 4 the cutter jet device comprises generally a frame 40 supporting a jet assembly 32 which has an upwardly opening slot inlet, not shown, on its upper surface 33. Bracket 41 carries arm 44 which is shown in the string up position. When the arm 44 is in this position, a warp sheet 10 of running filaments may be inserted through slot 45 to a position extending approximately from lengths 46 and 47 of the underside of arm 44. A bed knife 43 is supported by frame 40 for engagement with the lower edge of arm 44 during its downward travel. A pneumatic cylinder 48 is fixed to frame 40 with the travel of its piston 49 directed upwardly in the direction of arm 44. Fastened to piston 49 by a pin 42 is a link 50. This link rotates at one end about a pin 51 in frame 40 and is also attached to the lower end of arm 44 by a pin 39. Link 50 is joined at its other end to a link 54 by means of a slot 50a in link 50 carrying a pin 54a in the end of link 54. Link 54 is joined to link 55 by a pin 56 to form a knee at this joint. The other end of link 55 pivots about a pin 57 in frame 40 and is spring loaded by spring 58 to frame 40. A flat-ended pneumatic cylinder 60 is attached to frame 40 with its extensible rod 61 directed toward the knee between links 54 and 55. The rod 61 when fully retracted as shown bears upon the knee formed by links 54, 55 which are in an over-the-center relationship and prevented from further movement by rod 61. Thus, a linkage connected between associated pneumatic cylinders 48 and 60 and arm 44 provides a means to lock the arm into the position shown. The cutter is taken to the armed mode by charging cylinder 48 on the down side. This will cause link 50 to lower cutter 44 to a position just above the yarn lines. This will also lock the cutter in this position by the previously described mechanism.

Then by actuating the cylinder 60, rod 61 pushes the juncture of links 54, 55 over center at which point they no longer resist the force deriving from cylinder 48 by way of piston 49 and link 50. The resisting system collapses; piston 49 is fully retracted and link 50 rotates about pin 51 pulling arm 44 to its full stroke in a shearing action against bed knife 43. After the strands are cut they are picked up by jet 32 and aspirated to a suitable waste collection point such as hamper 11 (FIG. 1).

Figure 5:
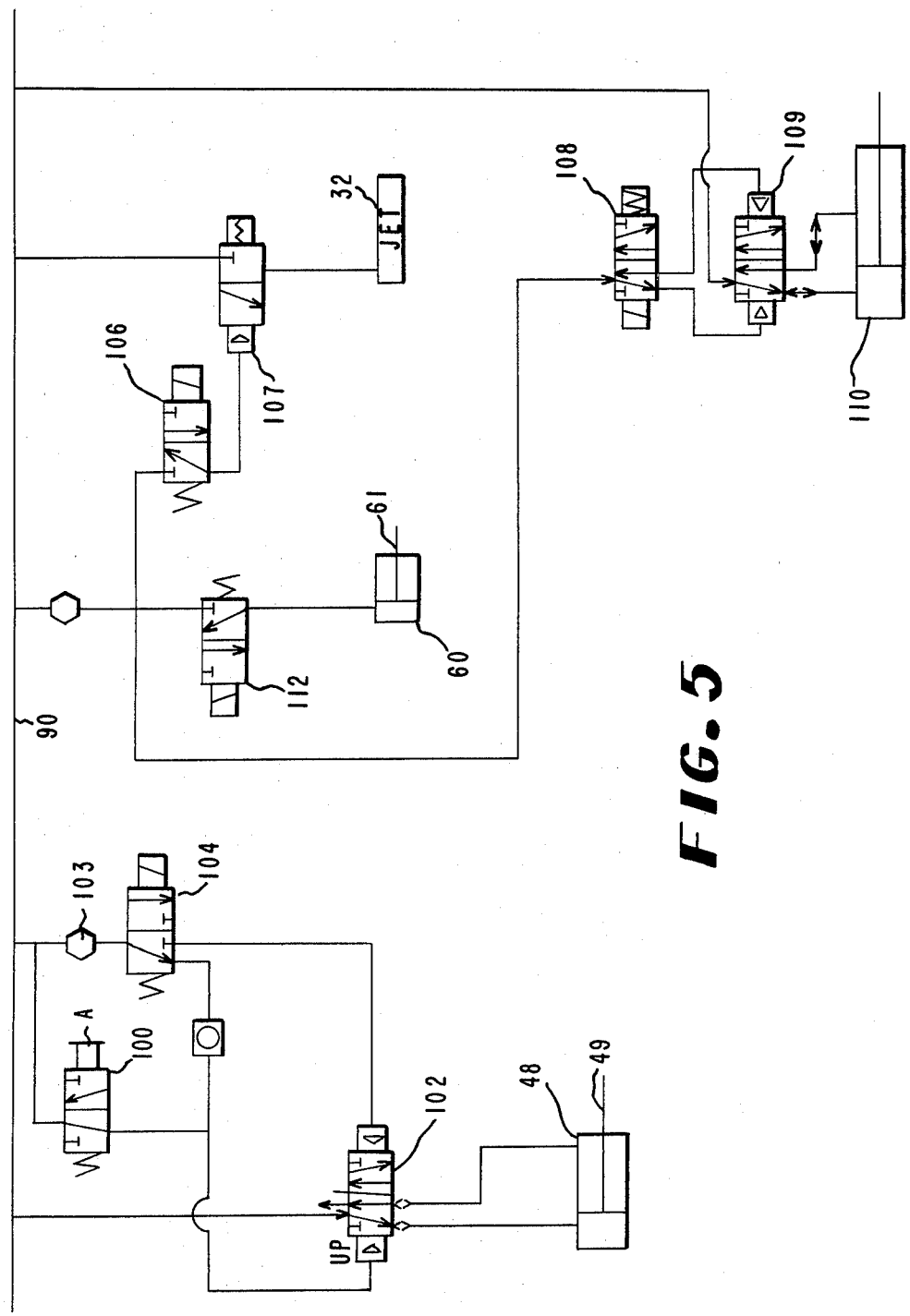
FIG. 5 is a schematic diagram of the pneumatic control system of the invention.

The operation of the cutter control system is more easily understood from the schematic of the pneumatic control system in FIG. 5.

In the string-up position air flows from the 175 psig supply manifold 90 through switch 100 to the up-pilot of 4-way spool valve 102 and from manifold 90 through valve 102 to cylinder 48 to hold piston 49 in the fully extended position. Spool A of switch 100 is pushed in and the up-pilot of valve 102 bleeds to atmosphere. Solenoid valve 104 is actuated putting 25 psig air on down-pilot of valve 102 (175 psig is reduced by regulator 103). Cylinder 48 is driven down until restrained by the linkage (through knee between links 54, 55 being held over-center by cylinder 60). When a defective condition arises energization of solenoids 106, 107 and 108 directs air to the waste jet 32, retracts the isolation bar 30 by acting through 4-way spool valve 109 and cylinder 110. After a delay of 400 milliseconds, an electrical signal is sent to solenoid valve 112 which extends rod 61 of cylinder 60 which pushes the knee of the linkage between links 54, 55 over center allowing piston 49 of cylinder 48 to retract fully causing the cutting action between arm 44 and bed knife 43 to cut the warp 10 which is picked up by the jet.

While the illustrated embodiment shows only one warp sheet, one cutter and one waste jet, it is to be understood that side-by-side warps could be handled by multiple waste jets and multiple cutter assemblies of the type described.

We claim:

1. In an apparatus for processing at least one continuous advancing strand, a cutting device for the strand comprising: a support situated adjacent the path of travel of the strand; a bed knife attached to said support and located below and across said path of travel; an arm positioned above the path of the strand for movement across the strand path to engagement with said bed knife; a linkage mechanism having a knee and being pivotally connected at one end to said support while the other end of the linkage mounts said arm for said movement; a first motive means coupled to said linkage for imparting said movement; a second motive means engageable with the knee of the linkage to hold the knee in an over-the-center position and limit movement of said arm to a location slightly above the strand path and then when energized, said second motive means moves the knee over center and allows said arm to complete its movement to engagement with said bed knife; means for removing the severed and continuously advancing strand located adjacent said bed knife; and a longitudinal member and mounting means between said longitudinal member and said support to allow transverse movement across the strand path above the strand removal means.

2. The apparatus of claim 1, said first and second motive means being externally operated pneumatic cylinder.

* * * * *